Dec. 4, 1934.  H. S. EBERHARD  1,982,729
ROLLER
Filed July 25, 1932
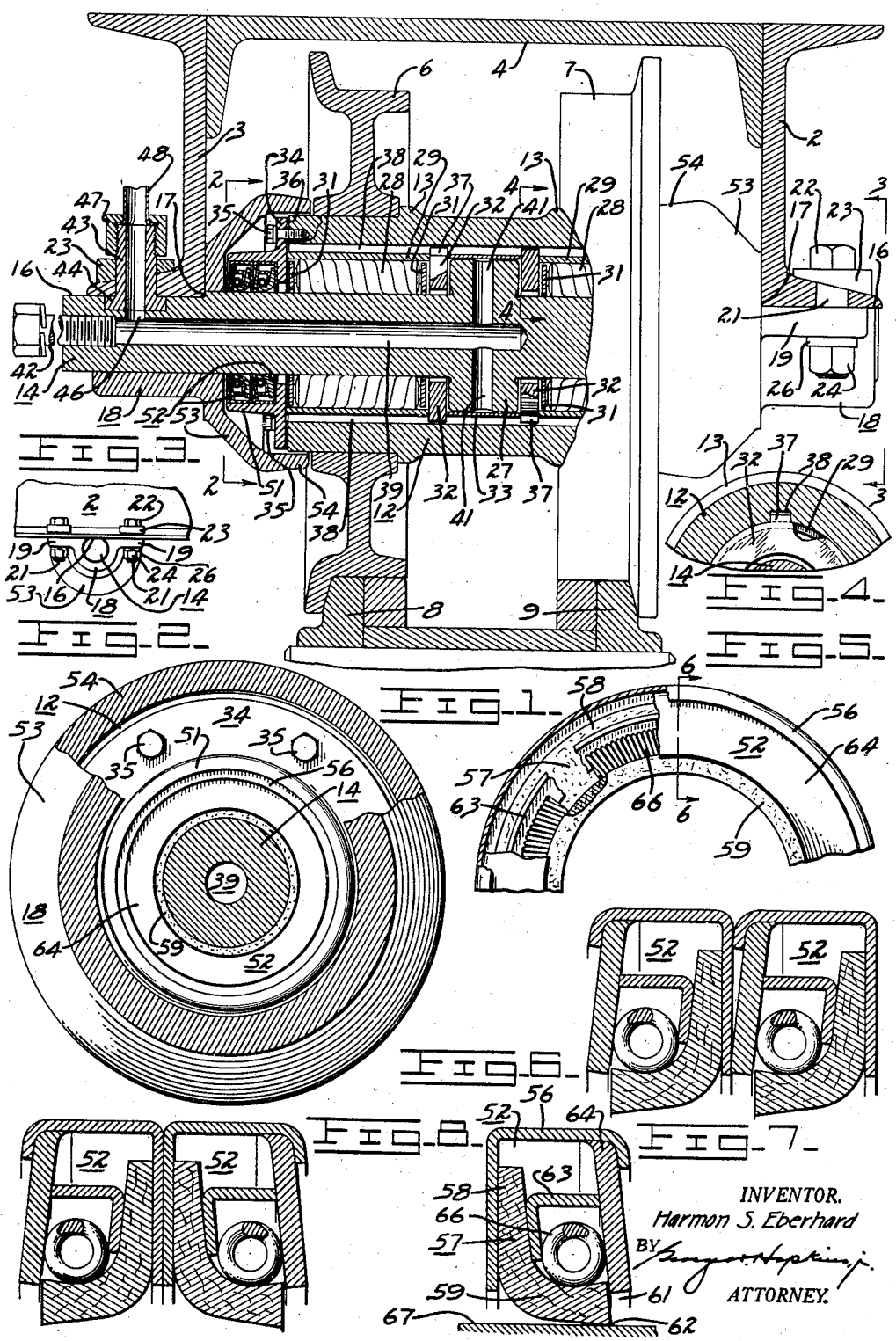
INVENTOR.
Harmon S. Eberhard
BY
ATTORNEY.

Patented Dec. 4, 1934

1,982,729

UNITED STATES PATENT OFFICE 1,982,729

ROLLER

Harmon S. Eberhard, San Leandro, Calif., assignor to Caterpillar Tractor Co., San Leandro, Calif., a corporation of California Application July 25, 1932, Serial No. 624,431

8 Claims. (Cl. 308—208)

My invention relates to wheels and rollers, and particularly to a truck roller and mounting, for supporting the weight of a track-type tractor on the flexible rails of the self-laying track thereof.

In track-type tractors, wherein the tractor travels over the rails of a self-laying track, rollers, attached to the truck frame of the tractor, are employed to support the tractor on the track. A tractor is frequently driven over sloping or uneven ground, which causes sideward inclination thereof. This results in end or axial thrust. Also, a tractor is frequently operated in dust, muddy ground, and in rain. It is, therefore, desirable to employ a seal, at each end of the truck roller, for protecting the parts against deleterious matter.

Heretofore, in order to take up end or axial thrust in either axial direction, it has been customary to employ thrust plates at each end of a truck roller. In such position, the thrust plates occupy considerable space and consequently do not allow much room for the sealing means. With the thrust plates at the ends of the roller, it is only with difficulty that they can be protected against deleterious matter. Furthermore, the thrust plates at the roller ends result in a more or less cumbersome roller structure, with considerable waste of space in the interior of the roller hub.

My invention is designed to obviate the foregoing described disadvantages; and it is, therefore, one of the objects of my invention to provide a compact and economical roller structure.

Another object of my invention is to provide a roller structure composed of few and simple parts.

Another object of my invention is to provide thrust take-up means between the ends of the roller hub.

Another object of the invention is to provide thrust take-up means in such position, as to be free of interference with the seals.

A further object of the invention is to provide efficacious sealing means at the ends of the roller.

A still further object of the invention is to provide improved means for mounting the roller on the truck frame of the tractor.

An additional object of the invention is to provide improved means for shrouding or protecting the sealing means at the ends of the roller.

Other objects of the invention will become apparent from a perusal of the following description thereof.

In general terms, the roller of my invention includes a hub, through which passes a stationary shaft or gudgeon attached to the truck frame of the tractor. Load bearings support the roller hub for rotation about the shaft; and thrust means, including thrust plates, are provided about the shaft at a position within the hub and between the hub ends, to take up lateral thrust in either axial direction and transmit it toward the ends of the hub. Keeper plates are attached to the ends of the hub for retaining the load bearings and also for absorbing the transmitted thrust. The keeper plates are formed to provide housings for suitable sealing means, rotatable with the hub and contacting with the gudgeon.

Reference will now be made to the drawing for a more detailed description of a preferred form of roller, in which drawing:

Fig. 1 is a longitudinal vertical section through the roller of my invention, and through the tractor truck frame and the track. A portion of the structure is shown in elevation for the purpose of disclosing more clearly the construction.

Fig. 2 is a transverse sectional view, taken in a plane indicated by line 2—2 in Fig. 1. A portion of the structure is omitted from the view to disclose more clearly the construction.

Fig. 3 is an end elevation, on a reduced scale, looking in the direction indicated by line 3—3 in Fig. 1.

Fig. 4 is a sectional view on the line 4—4 in Fig. 1. A part of the structure is broken away to disclose more clearly the construction.

Fig. 5 is a fragmentary front elevation of a type of sealing ring which may be employed at the end of the roller. A portion of the structure is broken away and a portion is shown in section, to disclose the internal construction of the seal.

Fig. 6 is a vertical sectional view of the sealing ring, taken in a plane indicated by line 6—6 in Fig. 5.

Fig. 7 is a vertical sectional view through two sealing rings positioned side by side, illustrating a preferred manner of mounting such rings at the end of the roller as is shown in Fig. 1.

Fig. 8 is a view similar to that of Fig. 7, but showing another manner in which the seal rings may be mounted.

In Fig. 1 is shown a portion of the tractor truck frame, to which the rollers are attached. The truck frame comprises an inner side channel 2, and an outer side channel 3 spaced from the inner channel. Both channels are rigidly secured, adjacent their upper flanges, to horizontal channel 4. Each roller or wheel comprises spaced flanged rims 6 and 7, adapted to travel over the flexible rails 8 and 9, respectively, of the self-laying tractor track. Rims 6 and 7 are shrunk upon hub 12, to abut against annular shoulders 13 formed integral on the upper surface of the hub.

Means are provided for rotatably securing the roller to the truck frame, and for taking up axial or end thrust. A gudgeon or fixed shaft 14 passes through the hub 12, and is formed with flats 16 at the upper part of each end thereof. Flats 16 bear against the under flanges of side channels 2 and 3, and they terminate in shoulders 17 which abut the webs of the side channels, thereby holding the shaft against axial movement. Shaft 14 is clamped against the undersides of the lower flanges of the side channels 2 and 3, by means (Fig. 3) including brackets 18 having lateral ears 19. The ears are apertured to allow passage of fastening bolts 21, the heads 22 of which bear on beveled washers 23, mounted on the upper sides of the lower flanges. Lock nuts 24 and lock washers 26, bearing against the undersides of ears 19, rigidly hold the shaft clamping means. Integrally formed with shaft 14 is a collar 27, which, as can be seen from Fig. 1, is within the hub, between its ends, and is located centrally thereof. The roller hub is journaled for rotation about the shaft, by means of load-supporting bearings, mounted at each side of collar 27 and terminating adjacent the ends of the hub.

Each of the load bearings comprises rollers 28, within bearing race 29 and journaled in annular end plates 31. Interposed between the inner ends of the load-supporting bearings and each side of collar 27, are annular thrust plates 32 encircling the shaft. A spacer sleeve 33, interposed between thrust plates 32, holds the thrust plates against the inner ends of bearing races 29, but spaced from the sides of collar 27. Outer ends of races 29 bear against keeper plates 34 for retaining the bearings. The keeper plates are attached to the ends of the hub by cap screws 35; gaskets 36 being clamped between the keeper plates and the ends of the hub to provide a tight joint therebetween. Thus, the truck frame and the shaft 14 rigidly fixed thereto, can shift axially relative to the roller; and the thrust plates 32, the races 29 and the spacer 33 are held against axial shifting relative to the roller by virtue of the absence of play between these parts. Consequently, regardless of the direction of axial shift of the truck frame, either one of the thrust plates will take up the axial thrust when collar 27 is brought into abutting relationship with a thrust plate as a result of relative shifting between the roller and the shaft. The thrust imparted by collar 27 will be transmitted by either of races 29 to either of keeper plates 34, depending upon the direction of thrust.

To preclude wear between the thrust plates 32 and the bearing races 29, which fit tightly within hub 12 and are consequently rotatable with the rollers, the thrust plates are also mounted for rotation with the roller. For this purpose, each of the thrust plates is formed with diametrically opposite keys 37, which keys engage in diametrically opposite and axially extending slots 38 (Fig. 4) formed on the inside of hub 12. In this connection, wear between spacer sleeve 33 and the thrust plates is precluded because the spacer sleeve by virtue of the tight fit between the thrust plates, and in the hub, is also rotatable with the roller. Thus, the hub 12, races 29, thrust plates 32, sleeve 33 and keeper plates 34 are rotatable, as a unit, about shaft 14.

In order that lubricant may be fed into the roller hub, so that parts inside the hub may be lubricated, when this is desired, shaft 14 is formed with an axially extending passageway 39, leading from the outer end of the shaft to an interior point past the collar 27. Passageway 39 communicates with radially extending passageways 41, formed in the collar; the latter passageways lead to the interior of the hub. It is thus seen that lubricant forced into passageway 39 will pass through passageways 41. From passageways 41, lubricant will pass into the space between collar 27 and keeper plate 33, then into the space between the collar and each thrust plate, and finally through the space between such thrust plate and the shaft and to the load bearings. Outer end of passageway 39 is normally sealed by threaded plug 42; and when it is desired to lubricate the interior of the roller by hand, plug 42 may be removed and a suitable lubricant fitting may be attached in its place.

In some tractors, it is customary to employ lubricant fittings, whereby automatic lubrication of parts may be obtained. I, therefore, provide such fitting for allowing automatic lubrication of the roller. The fitting comprises nipple 43, which is positioned at the outer side of the truck frame, and which passes through beveled washer 23 and through the lower flange of the outside channel 3. Nipple 43 is held between shaft 14 and the channel, by annular flange 44, integral therewith; which flange bears against the underside of the lower channel flange, and is seated in a recess formed in the outer flat 16 of the shaft. Nipple 43 communicates with aperture 46, which communicates with passageway 39. The upper end of the nipple is connected by coupling sleeve 47, to conduit 48 which leads to a pressure source of lubricant on the tractor. Thus, lubricant forced through conduit 48 will be led through passageway 39, to the interior of the hub in the manner previously explained.

Keeper plates 34, at the ends of the rollers, are each formed with an annular outwardly-projecting flange 51, which provides a housing for retaining suitable sealing means, to preclude the entrance of deleterious matter into the roller hub. Any suitable sealing means may be used, but it is preferred to employ sealing rings 52 of a character to be subsequently described. For protecting the sealing means within annular flange 51, shrouds 53, formed integral with brackets 18, are provided. The shrouds abut the webs of the truck frame side channels, and are formed with inwardly-projecting annular flanges 54; which extend closely adjacent the hubs of the roller rims 6 and 7, and overlap the ends of roller hub 12.

The preferred sealing ring 52 is illustrated in Figs. 5 and 6. It comprises an annular plate 56 of metal, L-shaped in section, and formed with a back vertical flange and a top peripheral flange. A flexible preformed annular sealing strip 57, having a vertical flange 58 bearing against the back flange of plate 56 and a horizontal flange 59 projecting into the aperture 61 of the sealing ring, is formed with a relatively sharp annular sealing edge 62. Sealing strip 57, is preferably of stiff fibrous material such as stiff leather, and it is clamped against the back flange of plate 56, by means of L-shaped metal ring 63, wedged against the sealing strip 57 and against the annular metal plate 64, to which the peripheral flange of plate 56 is secured. L-shaped ring 63 and horizontal flange 59 of the sealing strip form a housing with annular plate 64, in which is positioned an annular coiled spring 66 for resiliently maintaining the sealing edge 62 against the surface 67 of shaft 14.

Normally, the diameter of sealing edge 62 is less than the diameter of the member against which the sealing edge is adapted to contact. Upon placing of the sealing ring in the seal housing and about the shaft, the sealing strip will be expanded against the action of spring 66; and the spring will, therefore, press sealing edge 62 in contact with the member to be sealed.

A single sealing ring 62 may be mounted within the seal housing formed by annular flange 51; the diameter of the ring being such that it fits tightly within the seal housing so as to be rotatable with the roller. However, it is preferred to employ two sealing rings, positioned side by side and with the horizontal flanges of the sealing strips extending outwardly, as shown in Figs. 1 and 7. Such positioning of the sealing rings prevents entrance of deleterious matter to the roller bearings, but allows flushing of old lubricant out of the roller hub. Under the pressure of fresh lubricant forced into the hub, the strips will yield and thus allow the escape of old lubricant.

If desired, the sealing rings 52 may be positioned in the manner disclosed in Fig. 8, so that one horizontal flange of a sealing strip extends outwardly and the other inwardly. Such arrangement will prevent both the entrance of dirt into the portion to be sealed as well as preclude the escape of lubricant from said portion.

From the preceding description, it can be seen that the roller of my invention is both compact and economical to build. Its parts may be conveniently assembled as follows: The roller hub, with the roller rims 6 and 7 shrunk thereon and spacer sleeve 33 therein, may be passed over the shaft. Thrust plates may then be positioned to engage in slots 39; and the races 29 and roller bearings may be inserted into the hub. Next the keeper plates may be attached to the ends of the hub; and the sealing rings may be slipped over the shaft and into the seal housings of the keeper plates. The assembly may be then attached to the truck frame by the roller clamping means.

Should relative shifting occur between the roller and the truck frame, either one of fixed thrust plates 32 will take up the thrust imparted by collar 27, depending upon the axial direction of thrust. Inasmuch as no thrust plates are at the ends of the roller hub, a simple and compact sealing means at the roller ends may be employed and more space is allowed for such sealing means. Furthermore, since the thrust plates are inside the hub and well away from the ends of the hub, they are well protected. Also, the single member employed for imparting thrust in either axial direction, results in simplicity of construction.

Although I have described the roller or wheel of my invention, in connection with a tractor truck frame, it is apparent that a roller employing the principles of my invention may be employed for other purposes and in connection with other devices, if so desired.

I, therefore, claim as my invention:

1. A track roller construction comprising a frame, a shaft mounted against rotation on said frame, a hub, spaced load-supporting bearings including outer races mounting said hub on said shaft, a collar on said shaft between said spaced bearings, thrust plates between said bearings and said collar, said plates being spaced from said collar a small amount whereby relative axial shifting is provided between said shaft and said hub, a spacer between said plates, and keeper plates secured to the ends of said hub, said outer races being held between said keeper plates and said thrust plates, the engagement of said keeper plates, races, thrust plates, and spacer preventing axial play of said thrust plates with respect to said hub.

2. A track roller construction comprising a frame, a shaft having its ends secured to said frame, a hub, load-supporting bearings mounting said hub on said shaft, and means for absorbing end thrust between said hub and said shaft, including a thrust device on said shaft, and a plurality of engaged thrust members held against axial play with respect to said hub, certain of said members being adapted to engage said thrust device and being spaced therefrom to permit limited axial play between said hub and said shaft.

3. A track roller construction comprising a frame, an integral cylindrical shaft having its ends secured to said frame, a hub, rims on said hub adapted to engage the rails of a track, load-supporting bearings mounting said hub on said shaft, a collar on said shaft, and thrust plates adapted to engage said collar, said shaft and said collar being formed with passageways for conduction of lubricant into said hub.

4. A track roller construction comprising a frame, a shaft having its ends fixedly secured to said frame, a thrust collar rigid with said shaft intermediate the ends thereof, a wheel hub about said shaft, load-supporting means at each side of said collar and interposed between said shaft and said hub, a keeper plate secured to each end of said hub for rotation therewith, members within said hub and rigidly held between said keeper plates for transmitting axial thrust, said members including a thrust plate between each side of said collar and the load-supporting means adjacent said side, and seal housing means on each keeper plate for holding a seal to engage said shaft.

5. A track roller construction comprising a frame, a shaft having its ends fixedly secured to said frame, a thrust collar rigid with said shaft intermediate the ends thereof, a wheel hub about said shaft, load-supporting means at each side of said collar and interposed between said shaft and said hub, keeper means secured to each end of said hub for rotation therewith and consisting of only one plate engaging an end of the load-supporting means adjacent the end of said hub, members within said hub and rigidly held between said keeper plates for transmitting axial thrust, said members including a thrust plate between each side of said collar and the load-supporting means adjacent said side, and seal housing means on each keeper plate for holding a seal to engage said shaft.

6. A track roller construction comprising a frame, a shaft having its ends fixedly secured to said frame, a thrust collar rigid with said shaft intermediate the ends thereof, a wheel hub about said shaft, load-supporting means at each side of said collar and interposed between said shaft and said hub, a keeper plate secured to each end of said hub for rotation therewith, and members within said hub and rigidly held between said keeper plates for transmitting axial thrust, said members including a thrust plate between each side of said collar and the load-supporting means adjacent said side, said thrust plates being spaced a sufficient distance apart to provide a free space for allowing limited relative axial movement between said shaft and said hub.

7. A track roller construction comprising a frame, a shaft having its ends fixedly secured to said frame, a thrust collar rigid with said shaft intermediate the ends thereof, a wheel hub about said shaft, load-supporting means at each side of said collar and interposed between said shaft and said hub, a keeper plate secured to each end of said hub for rotation therewith, and members within said hub and rigidly held between said keeper plates for transmitting axial thrust, said members including a thrust plate between each side of said collar and the load-supporting means adjacent said side, said shaft and collar being formed with a lubricant passage terminating inside of said hub, and said thrust plates being spaced from said shaft and also a sufficient distance apart to provide a free space, said free space allowing limited relative axial movement between said shaft and said hub and providing a passage for flow of lubricant to said load-supporting means.

8. A track roller construction comprising a frame, a shaft having its ends fixedly secured to said frame, an annular thrust collar formed integrally with said shaft intermediate the ends thereof, a wheel hub about said shaft, load-supporting means at each side of said collar and interposed between said shaft and said hub, keeper means secured to each end of said hub for rotation therewith, each keeper means consisting of only one keeper plate, members within said hub and rigidly held in end to end engagement between said keeper plates for transmitting axial thrust, said members including a thrust plate between each side of said collar and the load-supporting means adjacent said side, said thrust plates being spaced a sufficient distance apart to provide a free space allowing limited relative axial movement between said shaft and said hub, and seal housing means on each keeper plate for holding a seal to engage said shaft.

HARMON S. EBERHARD.